JERRY G. HUGHES
CHARLES M. STASEY
JOHN K. BOWKER
INVENTORS.

ATTORNEY.

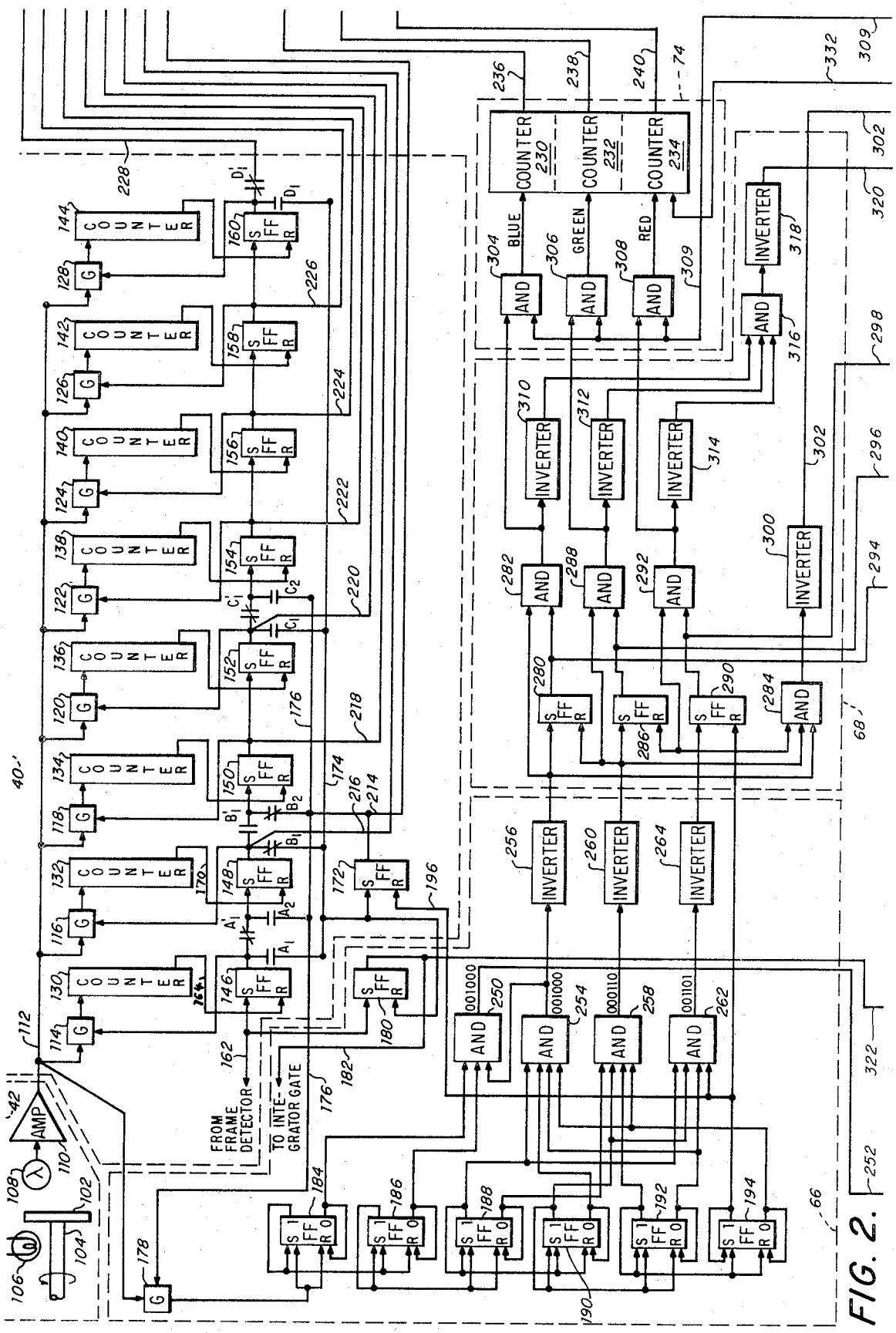

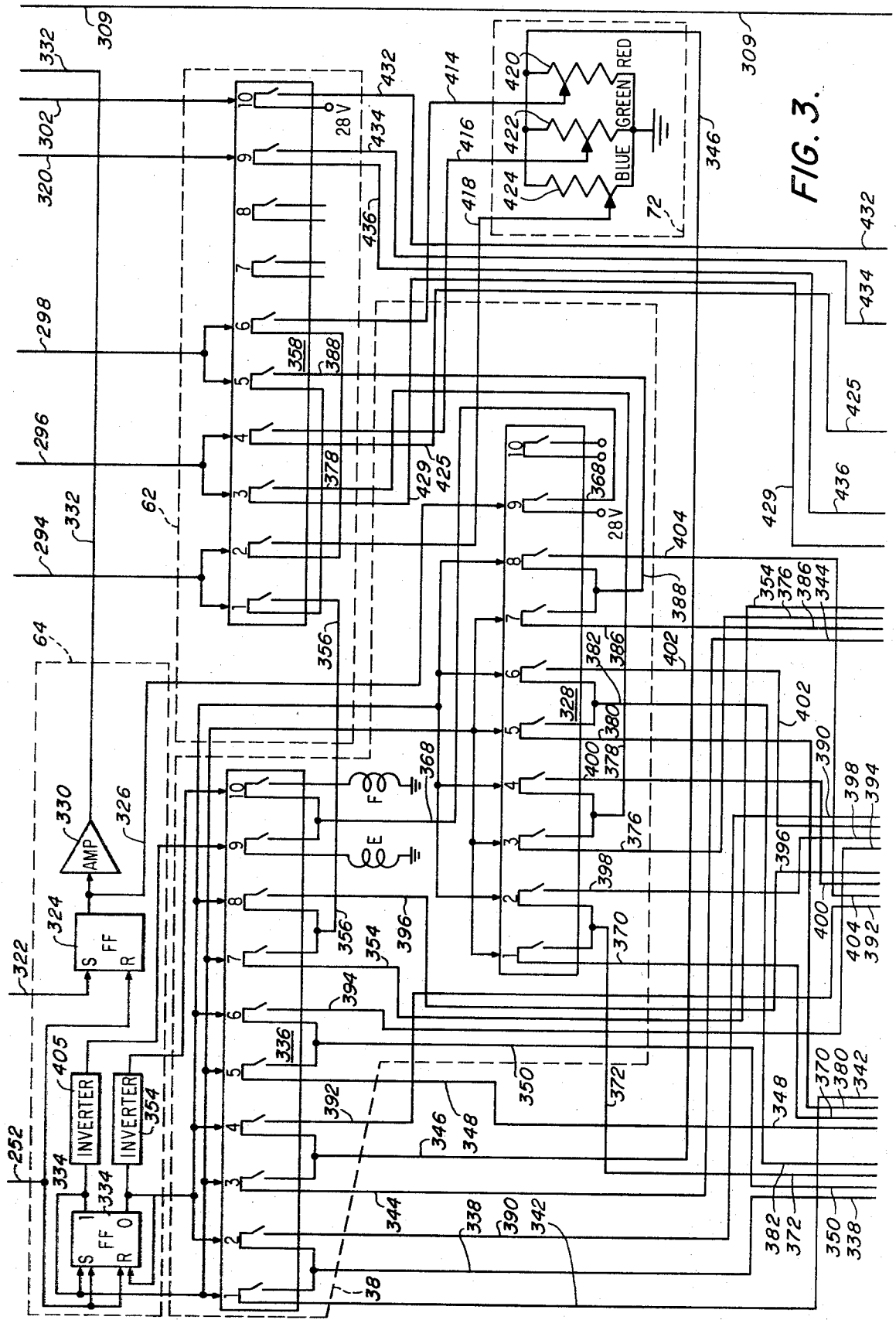

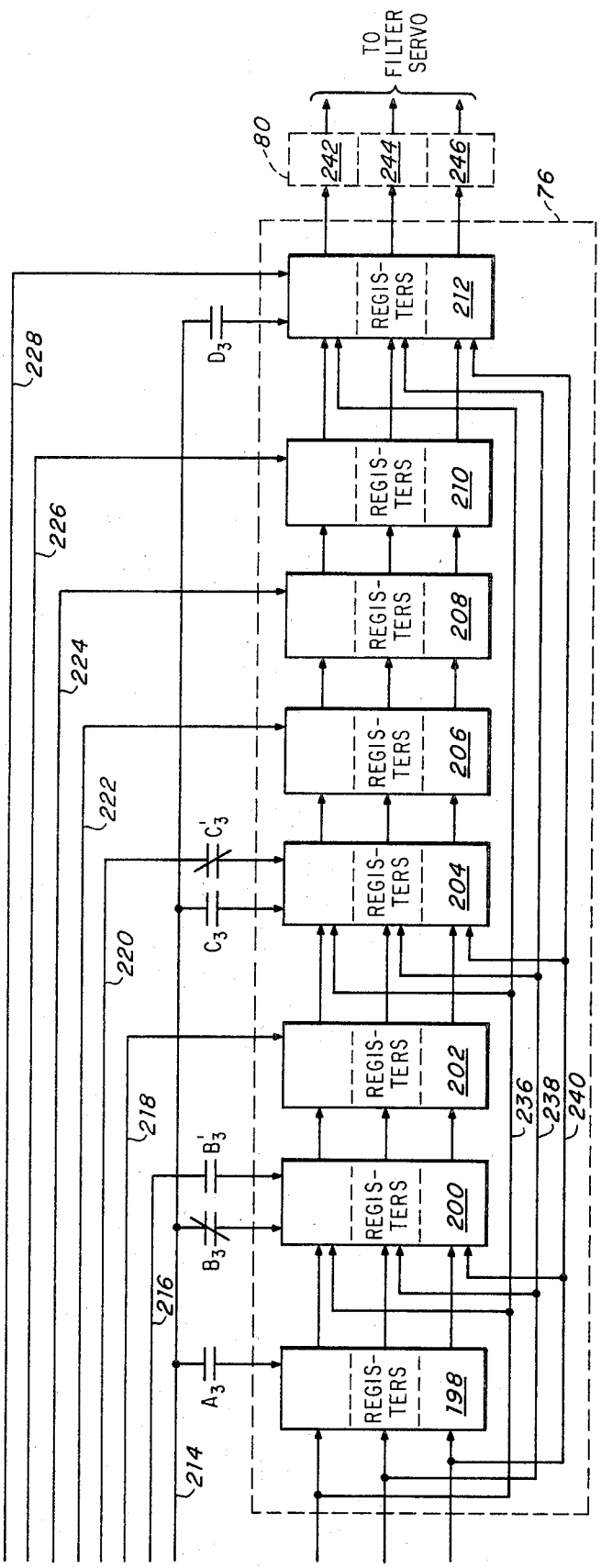
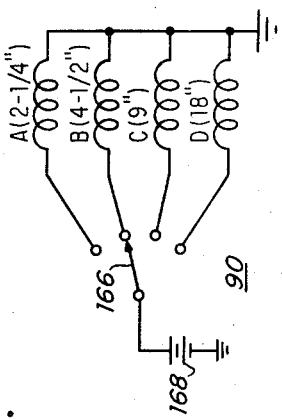
FIG. 7.
FIG. 4.
FIG. 6.

3,519,347
AUTOMATIC PRINTER SYSTEMS

John Kent Bowker, Marblehead, Jerry G. Hughes, Waltham, and Charles M. Stasey, Westwood, Mass., assignors to Itek Corporation, Lexington, Mass., a corporation of Delaware
Continuation-in-part of application Ser. No. 636,734, May 8, 1967. This application Jan. 26, 1968, Ser. No. 700,913
Int. Cl. G03b 27/04
U.S. Cl. 355—88
24 Claims

ABSTRACT OF THE DISCLOSURE

An automatic printer for controlling the color balance of a duplicate print from an original film strip. The original film strip is introduced into the printer and each frame is scanned to sense its color content for each of the three primary colors, red, green, and blue. Each sensed primary color is individually summed, but only from areas of each film frame which contain rapid color change. The sum of each primary color from all of the areas of rapid color change in a given film frame is compared against a desired sum for a color-balanced print. If the sum of each of the three primary colors is not balanced relative to each other, the printing of the duplicate print for that frame is corrected by altering the spectral content of light which is utilized to print the duplicate. As the original film strip enters the printer, it is first scanned to determine the color content of each film frame. The movement of the film strip through the printer is monitored, and the number of film frames passing through the printer is detected. Information from this monitoring and detection is utilized by a synchronizer circuit which controls the flow of color component information from the initial scanning stage of the processor to an integration stage where each color component is summed for a particular frame, then to a densitometer where each color component is changed into a digital indication of the density of that color component, and finally to a memory storage stage where that information is held until that particular film frame enters the printing stage of the printer wherein a duplicate print is made. The spectral content of the radiation from the printing light is altered by selectively positioning filters in front of the light if a color imbalance was detected for that film frame.

Cross-reference to related application

This application is a continuation-in-part of United States patent application S.N. 636,734, entitled Color Concentration Discriminators, by the same inventors, filed May 8, 1967.

Characterization of invention

This invention is characterized in an automatic printing machine for controlling the continuous, individual printing of a succession of individual film segments, comprising drive means for moving film having individual segments to be printed through the machine, scanning means for sensing the intensity of the light from the film, integrator means, responsive to the scanning means, for summing the intensity of the light sensed from individual segments of the film, storage means for individually storing the information sensed from individual film segments, read control means for directing transfer of information relating to individual film segments from the integrator means to the storage means, printing means for exposing print stock through individual film segments, servo-mechanism means, responsive to the storage means for individually controlling the intensity of the exposing light for each film segment at the printing means, and synchronizing means, responsive to movement of the film, for timing the operation of the read control means and for transferring particular information from the storage means to the servo-mechanism means when the segment from which that information was derived is at the printing means.

Background of invention

This invention relates to automatic printing machines and, more particularly, to such machines capable of performing color printing.

Conventional printing machines of the start-stop variety in which a human operator previews each frame are inherently slow and produce prints of inconsistent quality. The inconsistency is a consequence of the varying and uncontrollable qualities of operator judgment which must be applied to check and correct frame positions and alignment, and the exposure balance of each frame.

The slowness of operation and inconsistency of results is more pronounced in color printing machines where the operator must check and correct the color balance of each frame to prevent subject failure. Subject failure may be explained as follows.

Conventional automatic color printing machines sense the total amount of each primary color on an original film or negative and adjust the light used to expose the printing stock to the original accordingly. On the assumption that all random scenes in nature comprise equal components of the primary colors red, blue, and green, an especially workable assumption when dealing with aerial photography, such machines consider a color-balanced scene to be neutral or gray and control the exposure light accordingly. If the green component is larger than the red and blue components for example, a magenta filter is used to reduce the green component. This method of operation is workable when the total amounts of the primary color components are drawn nearly equally from all the many items in the scene.

However, when there is a large area of a single color in the scene, the primary color components or other components included in that color will often have higher totals than the components not included in the color. But, when the filters controlling the light source are applied according to the component totals, they bias all the light used to expose the entire scene. Thus, a scene containing a portion of blue water will have a red cast resulting from the machine having overcompensated by removing the blue in an attempt to provide a color-balanced or gray print. This is generally referred to as "subject failure."

Attempts to automatically prevent subject failure have been unsuccessful and attempts to increase the speed of operation and/or make the operation a continuous one have been hampered by a lack of fast, reliable automatic means for controlling sequential, continuous, individual printing of a succession of film frames. Proper sequential operation is particularly important when the frames or other discrete portions or segments are analyzed at a station separate from the printing station. In such arrangements an omitted frame or overlapping pair of frames may erroneously cause the information derived from one frame at the analyzing station to be applied to control the light at the printing station at a time when another frame, or frames, are at the printing station.

Whether the analysis of the film frames is performed automatically or by an operator, the exposure balance information produced is usually in the form of analog expressions of light intensity, whereas conventional exposure balancing correction equipment is best controlled by density information. Particularly in the case of automatic analysis, conversion from one form of expression to the other may be a limiting factor in the speed of operation of the machine. And in high speed computing apparatus information is more easily processed in digital form than in analog form.

Another problem encountered in attempting to provide continuous and high speed printing machines is the requirement for a flat light source which can effect proper, even exposure across the plane of the film.

Summary of invention

Thus it is desirable to provide a printing machine for automatically controlling the continuous, individual printing of a succession of film frames or segments.

It is further desirable to provide such a machine which automatically detects frames of the film without the need for previewing or marking of the film and which produces signals indicative of frame detections for co-ordinating operation of the machine.

It is further desirable to provide such a machine which automatically, quickly, efficiently and reliably converts analog intensity signals to digital density signals.

It is further desirable to provide such a machine having a flat, elongated light source of uniform intensity to accurately, uniformly expose the print stock at the printing station.

It is further desirable to provide such a machine capable of coloring printing operations and providing for discriminating concentrations of a particular color on a film frame and preventing those concentrations from erroneously biasing exposure light and causing subject failure.

The invention is accomplished by an automatic printing machine for controlling the continuous and individual printing of a succession of individual film segments, comprising drive means for moving film having individual segments to be printed through the machine, scanning means for sensing the intensity of the light from the film, integrator means, responsive to the scanning means, for summing the intensity of the light sensed from individual segments of the film, storage means for individually storing the information sensed from individual film segments, read control means for directing transfer of information relating to individual film segments from the integrator means to the storage means, printing means for exposing print stock through individual film segments, servo-mechanism means, responsive to the storage means, for individually controlling the intensity of the exposing light for each film segment at the printing means, and synchronizing means, responsive to movement of the film for timing the operation of the read control means and for transferring particular information from the storage means to the servo-mechanism means when the segment from which that information was derived is at the printing means.

Other embodiments include frame detecting means for distinguishing frames of the film, density converter means responsive to the integrator means, for converting the information in the integrator means in the form of analog intensity signals to digital density signals for delivery to the storage means, color concentration discriminator means for controlling transfer of information from the sensing means to the integrator means, and optical apparatus for converting light from a concentrated source into an elongated flat light source of uniform intensity.

Disclosure of specific embodiment

Other objects, features, and advantages will appear from the following description of a preferred embodiment of the invention as shown in the attached drawings, in which:

FIG. 2 is a detailed block diagram of the encoder, synchronizer, read control, densitometer switches control and accumulator portions of FIG. 1;

FIG. 3 is a detailed diagram of the integrator switches control, integrator switches, densitometer switches, and densitometer balance portions of FIG. 1;

FIG 4 is a detailed diagram of the storage and digital to analog converter portions of FIG. 1;

FIG. 6 is a diagram showing the proper relation of FIGS. 2, 3, 4, and 5;

FIG. 7 is a detailed diagram of the frame size program switch of FIG. 1;

FIG. 11 is a detailed front view of the printing optics of FIG. 1;

FIG. 12 is a detailed side view of the printing optics of FIG. 11.

Figure 1:
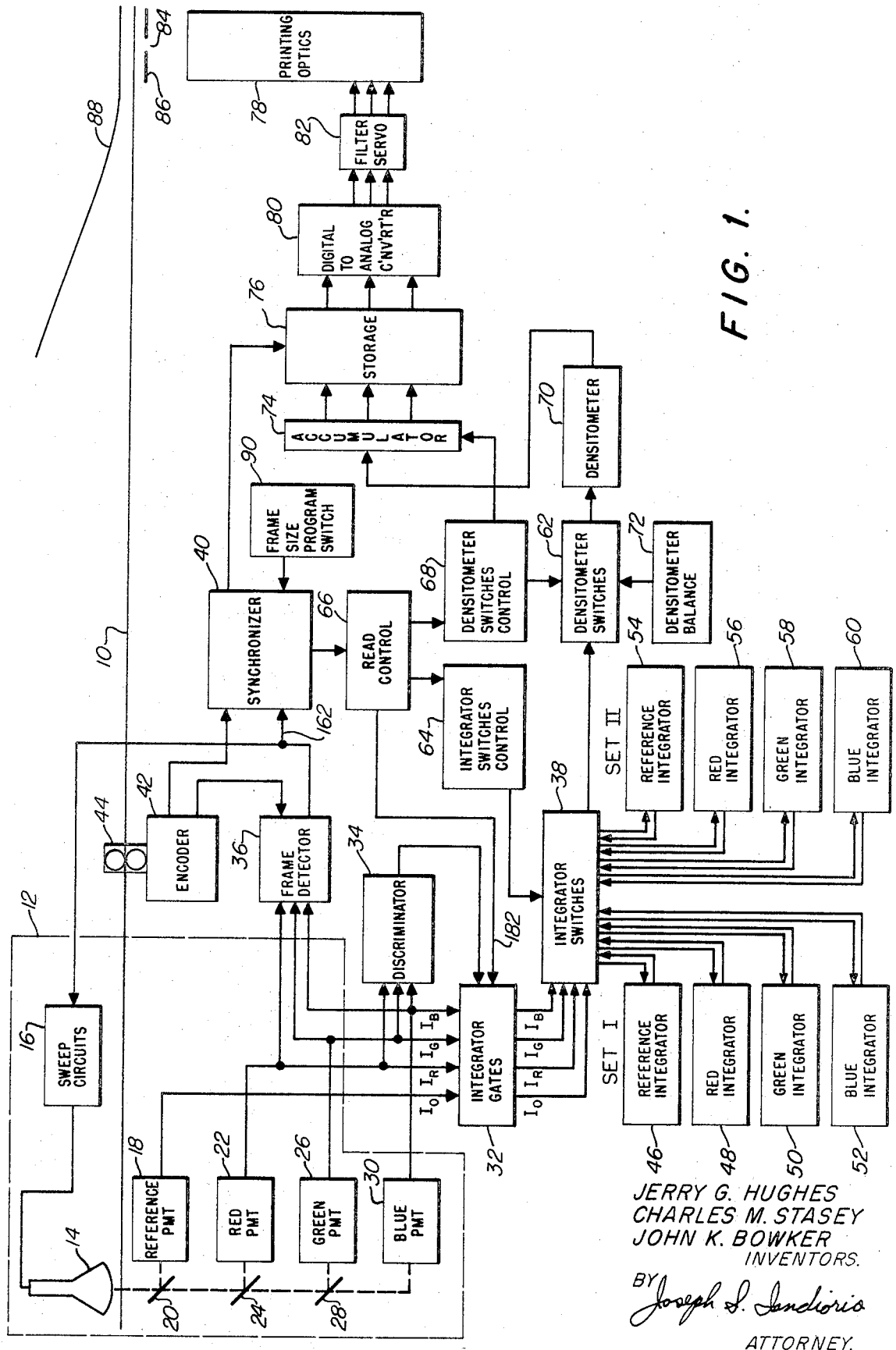
FIG. 1 is a block diagram of an automatic color printer machine according to this invention.

There is shown in FIG. 1 a block diagram of the printer system including a strip of processed film 10 having a plurality of frames or segments moving through a photometer 12 in which the intensities of the red, green and blue light from the film are sensed. The word "from" when used in this application in connection with such statements as "light 'from' film 10," as in the previous sentence, is to be interpreted as generic to the concepts of light reflected off film 10 and light passed through film 10. The light source illuminating film 10 may be on the same side of the film as the sensing device or may be on the opposite side of the film from it, as is shown in the specific embodiment disclosed herein. Film 10 is illuminated by cathode ray tube scanner 14 driven by sweep circuits 16 which provide a slow sweep line-raster over the information-bearing portion of the frames and a fast sweep line-raster over the expected border portions.

The intensity of a portion of the light from scanner 14 is sensed by reference photomultiplier tube 18 by means of partial mirror 20 while the rest of the light passes through film 10 where the intensity of the red light reflected by dichroic mirror 24 is sensed by red photomultiplier tube 22, the intensity of the green light passing through dichroic mirror 24 and reflected by dichroic mirror 28 is sensed by green photomultiplier tube 26 and the intensity of the blue light passing through dichloric mirror 28 is sensed by blue photomultiplier tube 30.

The outputs of photomultiplier tubes 18, 22, 26, and 30 labelled $I_O$, $I_R$, $I_G$, and $I_B$, respectively, are supplied to integrator gates 32 where they must await enabling signals from color concentration discriminator 34 and frame detector 36 before passing to integrator switches 38.

Frame detector 36 receives the outputs of photomultiplier tubes 22, 26, and 30 and provides inputs to synchronizer 40 via lead 162, sweep circuits 16 and gates 32 via synchronizer 40 and read control 66. Encoder 42 produces an output representative of the motion of film 10 as it is driven through the machine by drive mechanism 44. The output of encoder 42 is in the form of digital signals which are submitted to synchronizer 40 and to frame detector 36. A counter in frame detector 36 begins accumulating these signals each time a frame is detected, and since the approximate distance between the frame border portions is known for any given film frame size, a particular count may be designated as the beginning of the interval when a frame border is expected. Another count toward the end of the interval is designated to trigger an independent pulse as a substitute frame detection signal in order to preserve the sequential operation of the machine in the event that no frame border is actually detected. Frame detector 36 is more fully explained in the discussion of FIGS. 9 and 10, infra.

In discriminator 34, which receives the outputs of photomultiplier tubes 22, 26, and 30, the red, green, and blue intensity signals are converted to density signals and operated on to determine whether a concentration of a color is currently being sensed. Frame detector 36 and discriminator 34 permit information to pass through gates 32 if the colors being sensed at contiguous portions of a frame are constantly varying *and* an information-bearing section of the frame is being sensed. If a concentration of a color is discriminated, i.e. two successively sensed portions contain the same color, *or* frame detector 36 has not provided a signal indicating that the information-bearing section of a new frame is being sensed, gates 32 prevent passage of the information. The outputs of detector 36 and discriminator 34 are a function of the signals passing through gates 32.

Integrator switches 38 connect the reference 46, red 48, green 50, and blue 52 integrators of Set I to the $I_O$, $I_R$, $I_G$, and $I_B$ signals from gates 32, while it connects the reference 54, red 56, green 58, and blue 60 integrators of Set II to densitometer switches 62 during the sensing of one frame, then switches the connections of Sets I and II during the sensing of the next frame under the direction of integrator switches control 64 which is commanded by read control 66. Discriminator 34 is more completely explained and implemented in co-pending United States patent application S.N. 636,734, Color Concentration Discriminators, filed May 8, 1967, of which this application is a continuation-in-part.

Densitometer switches control 68 directs densitometer switches 62 to successively connect the red, green, and blue integrators, of whichever of Sets I and II is connected to the densitometer switches 62, to densitometer 70, while continually connecting the reference integrator to it. For example, if Set II were connected to densitometer switches 62, control 68 would first connect integrators 54 and 56, then integrators 54 and 58, and finally integrators 54 and 60 to densitometer 70.

Densitometer switches control 68 is responsive to signals from read control 66 which separates into a number of periods the time during which film 10 is moved a distance of approximately two inches. In the first period the integrators whose information was just read out to densitometer 70 are discharged; at the end of that period the integrators that were just summing the $I_O$, $I_R$, $I_G$, and $I_B$ signals from gates 32 are switched to densitometer switches 62 and the integrators whose information was just transferred to densitometer 70 are switched from densitometer switches 62 to integrator gates 32; during the second, third, and fourth periods of the time of a frame length movement the information in each of the red, green, and blue integrators presently connected to densitometer switches 62 is successively read out to densitometer 70.

Densitometer balance 72 applies information from a reference integrator to adjust the input from the red, green, and blue integrators associated with that reference integrator to compensate for the inherent imbalances between the red, green, and blue sensitivities of the system.

Densitometer 70 separately compares a capacitor discharge with information from a reference integrator forming part of the densitometer and one of the red, green, and blue integrators. Since a signal representing the integrated reference information contains all colors provided by scanner 14, albeit only a portion of the light supplied, it coincides with discharging capacitor signal at a higher value, viz. earlier stage, than does the signal representing the information in one of the red, green, or blue integrators. Because capacitor discharge follows a negative exponential path, the difference between the coincidence of the two signals is an indication of the density of the particular color. By using comparators to produce a signal at these coincidence points and applying those signals to open and close a gate controlling the output of a clock pulse source, the number of pulses passing through the gate represents the density of the red, green, or blue light expressed in digital form. Densitometer 70 is more fully explained in the discussion of FIGS. 3 and 5, infra.

Accumulator 74 includes three counters for individually receiving the digitalized density information derived from the color integrators which were successively connected to densitometer 70. Accumulator 74 also includes gate means for directing the output from densitometer 70 to the proper one of those counters under command of the densitometer switches control 68. These commands correspond and occur simultaneously with those directed to densitometer switches 62 during the second, third, and fourth periods discussed supra.

Storage 76 separately retains the three sets of digital signals from accumulator 74 in a series of registers until the film frame from which they were derived is at printing optics 78.

Information read out of storage 76 is transferred to digital-to-analog converter 80 where it is converted into three analog density signals for driving the three elements of filter-servo 82 which carry subtractive color filters. The filters are interjectable into a narrow light beam formed by lenses in printing optics 78 prior to the thorough mixing and the shaping of the beam therein which results in production of a straight line light source of uniform spectral intensity at slit 84 in plate 86 where print stock 88 is exposed through film 10.

Synchronizer 40 receives pulses from encoder 42 indicating movement of film 10 and periodically receives signals from frame detector 36 indicating that a new frame is being sensed. As a first function synchronizer 40 coordinates operation of controls 64 and 68 so that the entire procedure ascribed to them may be performed during the time required for film 10 to move the length of a frame. As a second function synchronizer 40 controls the movement through the series of registers of storage 76 of each parcel of information derived from a separate frame and coordinates that movement with movement of the corresponding frame as it proceeds from photometer 12 to printing optics 78.

Thus the printing of a plurality of frames or segments of information on a processed film may be automatically sequentially controlled to effect continuous yet individual printing of a succession of individual frames using exposure light whose characteristics are tailored in accordance with the requirements of the particular one of the frames which is at the printing station.

Frame size switch 90 programs the size of the frames on the film currently being processed to define the total time during which read control 66 must direct manipulation of the information by controls 64 and 68, and to define the register in storage 76 to which the information from accumulator 74 must be submitted for it to control filter-servo 82 coincidentally with arrival of the corresponding frame at printing optics 78.

Encoder 42, synchronizer 40, read control 66, densitometer switches control 68, and accumulator 74 are shown in more detail in FIG. 2.

Encoder 42 includes a light interrupting disc 102 rotatable with shaft 104 engaged with drive mechanism 44 for interrupting the light radiating from lamp 106 toward photo-electric cell 108 which delivers a train of pulses to amplifier 110 as a function of film movement at the rate of 32 pulses per inch of film travel. Deriving the timing pulses from film movement rather than from a clock pulse device preserves proper operation of the system irrespective of any irregularities in the rate of film travel.

Pulses from amplifier 110 are delivered to synchronizer 40 on line 112 connected to gates 114, 116, 118, 120, 122, 124, 126 and 128, which control the inputs to counters 130, 132, 134, 136, 138, 140, 142, and 144 and are controlled by flip-flops 146, 148, 150, 152, 154, 156, 158, and 160, respectively. Each of these counters is a six-digit binary counter capable of counting sixty-four pulses or two inches of film travel: an output produced by one of these counters to the reset input of its associated flip-flop is a measurement of two inches of film travel. A signal on line 162 from frame detector 36 keys the measuring process by switching flip-flop 146 to its set state which enables gate 114 to pass pulses to counter 130.

The sixty-fourth count accumulated by counter 130 produces a signal on line 164 which switches flip-flop 146 to its reset state disabling gate 114. If relay contacts $A_1'$ are closed, the signal produced by flip-flop 146 as it switches to its reset state switches flip-flop 148 to its set state which then enables gate 116 to pass pulses to counter 112.

The $A_1$, $A_1'$, $A_2$, $B_1$, $B_1'$, $B_2$, $C_1$, $C_1'$, $C_2$, $D_1$, and $D_1'$ relay contacts are controlled by frame size programming switch 90 shown in more detail in FIG. 7. Switch 90 consists of a blade 166 for connecting a 28 volt battery 168 to one of relay coils A, B, C, D. When a particular one of coils A, B, C, and D is energized, that coil's primed subscript 1 contact is open and its unprimed subscript 1 and subscript 2 contacts are closed; unenergized coils have their primed subscript 1 contact closed and the unprimed subscript 1 and subscript 2 contacts open. Selecting operation with a 4½ inch frame film as an example, coil B is energized and contacts $A_1'$, $B_1$, $B_2$, $C_1'$ and $D_1'$ are closed; contacts $A_1$, $A_2$, $B_1'$, $C_1$, $C_2$, and $D_1$ are open. Thus, flip-flop 148 does receive the signal from flip-flop 146 as it switches to its reset state and counter 132 is applied to measure the next two inches of film travel.

When the sixty-fourth count is accumulated in counter 132 a signal on line 170 switches flip-flop 148 to its reset state, producing an output signal which is prevented by open contacts $B_1'$ from switching the next flip-flop 150 in the series and is instead directed by contacts $B_1$ to flip-flop 172 via bus 174. The signal from flip-flop 172 in the set state on bus 176 opens gate 178 but is ineffectual to switch flip-flop 150 through closed contacts $B_2$ for it is the change from the set to the reset state of flip-flop 178 that produces a signal capable of switching flip-flop 150. The signal on bus 174 is also directed to switch flip-flop 180 to its reset state. Flip-flop 180 is set by a signal from frame detector 36 on line 162 to provide a signal on line 182 to enable information to pass through gates 32 and when reset by a signal on bus 174 prevents gates 32 from passing information.

With the opening of gate 178 the function of measuring film travel for the particular frame just sensed by photometer 12 has been transferred from synchronizer 40 to read control 66. The pulses from amplifier 110 are now fed to flip-flop 184, which together with flip-flops 186, 188, 190, 192, and 194 constitute a six-digit binary counter similar to those in synchronizer 40. Flip-flops 184, 186, 188, 190, 192, and 194 are wired in such a manner that the set and reset inputs are gated by the set and reset outputs. Thus, when flip-flop 184 is in the set state the next signal from gate 178 will be gated to the set input and switch the flip-flop to the reset state. And when it is in the reset state the next signal from gate 178 will be gated to the reset input and switch the flip-flop to the set state. The flip-flops are connected so that each time a particular flip-flop is switched to its set state it provides a signal to both the set and reset inputs of the next highest order flip-flop to switch the state of that flip-flop from whichever state it may be in to the other state. When the sixty-fourth count is reached a signal is produced on line 196 to reset flip-flop 172 which disables gate 178 and sets flip-flop 150 through contacts $B_2$.

The measuring function for that particular frame is thus returned to synchronizer 40 and assumed by successive counters in the series until that frame reaches printing optics 78. At that point the signal from flip-flop 160 after the sixty-fourth pulse has been accumulated in counter 144 is used to control transfer of the information from storage 76 to digital-to-analog converter 80.

The eight counters in synchronizer 40 plus the counter in read control 66 represent a distance of eighteen inches which is the space between the output end of photometer 12 and the input end of printing optics 78. According to the size of the film being processed that eighteen inches may be occupied by eight 2¼ inch frames, four 4½ inch frames, two 9 inch frames or a single 18 inch frame.

If frame size program switch 90 is set for 2¼ inch, 4½ inch, or 9 inch frames, read control 66 assumes the function of measuring a two inch increment of film following measurement of that increment by counters 130, 132, or 136, respectively, and returns the measuring function to counters 132, 134, or 138, respectively. In the case of 18 inch frames, read control 66 assumes the measuring function following counter 144 but does not return the function to synchronizer 40, for the leading edge of an 18 inch frame is at printing optics 78 immediately upon completion of the sensing of its lagging edge by photometer 12. A contact $D_2$, analogous to $A_2$, $B_2$, and $C_2$, is therefore unnecessary. Also in the case of 18 inch frames, read control 66 assumes the function of measuring a two inch increment of film after all of the eight counters 130, 132, 134, 136, 138, 140, 142, and 144 have each measured two inches of film travel, so that read control 66 transfers information in the integrators accumulated from the first 16 inches of a frame to the densitometer while the last two inches of that frame is moving through photometer 12. This means that the signals used to control filter-servo 82 for exposure of an 18 inch frame are derived only from the first 16 inches of that frame, for when counter 144 has completed measuring the 14-to-16 inch portion of the frame, a signal on line 174, through closed contacts $D_1$, resets flip-flop 180 cutting off the signal on line 182 which enables integrator gates 32 to receive information from photometer 12. The loss of that two inches of information is not critical and may be expediently sacrificed to avoid the need for additional logic circuitry.

Synchronizer 40 is also used to shift the information sensed at photometer 12 through the eight registers 198, 200, 202, 204, 206, 208, 210, and 212 in storage 76, FIG. 4. Information is shifted through registers 200, 202, 204, 206, 208, 210, and 212 by signals on lines 216, 218, 220, 222, 224, 226, and 228 originating at the set outputs of flip-flops 148, 150, 152, 154, 156, 158, and 160, respectively. Shifting of register 198 is controlled by signals on line 214 which originates at the set output of flip-flop 172. Line 214 also provides shift commands to register 198, and by-pass commands to registers 200, 204, and 212 as controlled by contacts $A_3$, $B_3$, $C_3$, and $D_3$.

During the time that read control 66 assumes the measuring function, the digitalized density signals from densitometer 70 are accumulated in the three separate counters 230, 232, and 234, corresponding to the blue, green, and red density information, respectively, of accumulator 74. At the end of that time, when synchronizer 40 regains the measuring function for a particular frame, a signal is delivered on line 214 by flip-flop 172. If frame size program switch 90 is set for 2¼ inch frames, synchronizer 40 regains the measuring function for a particular frame through contact $A_2$, if set for 4½ inch frames it regains the measuring functions through contact $B_2$, and if set for 9 inch frames, through contact $C_2$. Wherever in the series of counters read control 66 is introduced, then it will produce a signal on line 214 at completion of its measuring function for a particular frame, and that signal is directed to either register 198, 200, 204, or 212 by by-pass contacts $A_3$, $B_3$, $C_3$, or $D_3$, respectively, as controlled by frame size program switch 90.

Register 198 requires no separate shifting input for it is used only to receive information from 2¼ inch frames from accumulator 74 on lines 236, 238, and 240. Register 200 may receive information from register 198 shifted by a signal on line 216 if contact $B_3'$ is closed or receive information directly from accumulator 74 on lines 236, 238, and 240 by a signal on line 214 if contact $B_3$ is closed. Register 204 may receive information from register 202 shifted by a signal on line 220 if contact $C_3'$ is closed or receive information from lines 236, 238, and 240 directly by a signal on line 214 if contact $C_3$ is closed. And register 212 may receive information from register 210 shifted by a signal on line 228 or directly from lines 236, 238, and 240 by a signal on line 214 if contact $D_3$ is closed. Register 198 requires but one shifting instruction input for it can receive information only from lines 236, 238, and 240. Registers 200, 204, and 212 each have two shifting instruction inputs for they can receive information from preceding registers or lines 236, 238, and 240; contacts $B_3$, $B_3'$ are associated with the same contact arm so that one is open and the other is closed at all times. $C_3$ and $C_3'$ are similarly constructed. A $D_3'$ contact is not required for it is redundant in view of contact $D_1'$. The blue, green, and red information in register 212 in digital form is converted to analog form by three separate digital-to-analog components 242, 244, and 246 of converter 80.

Figure 8:
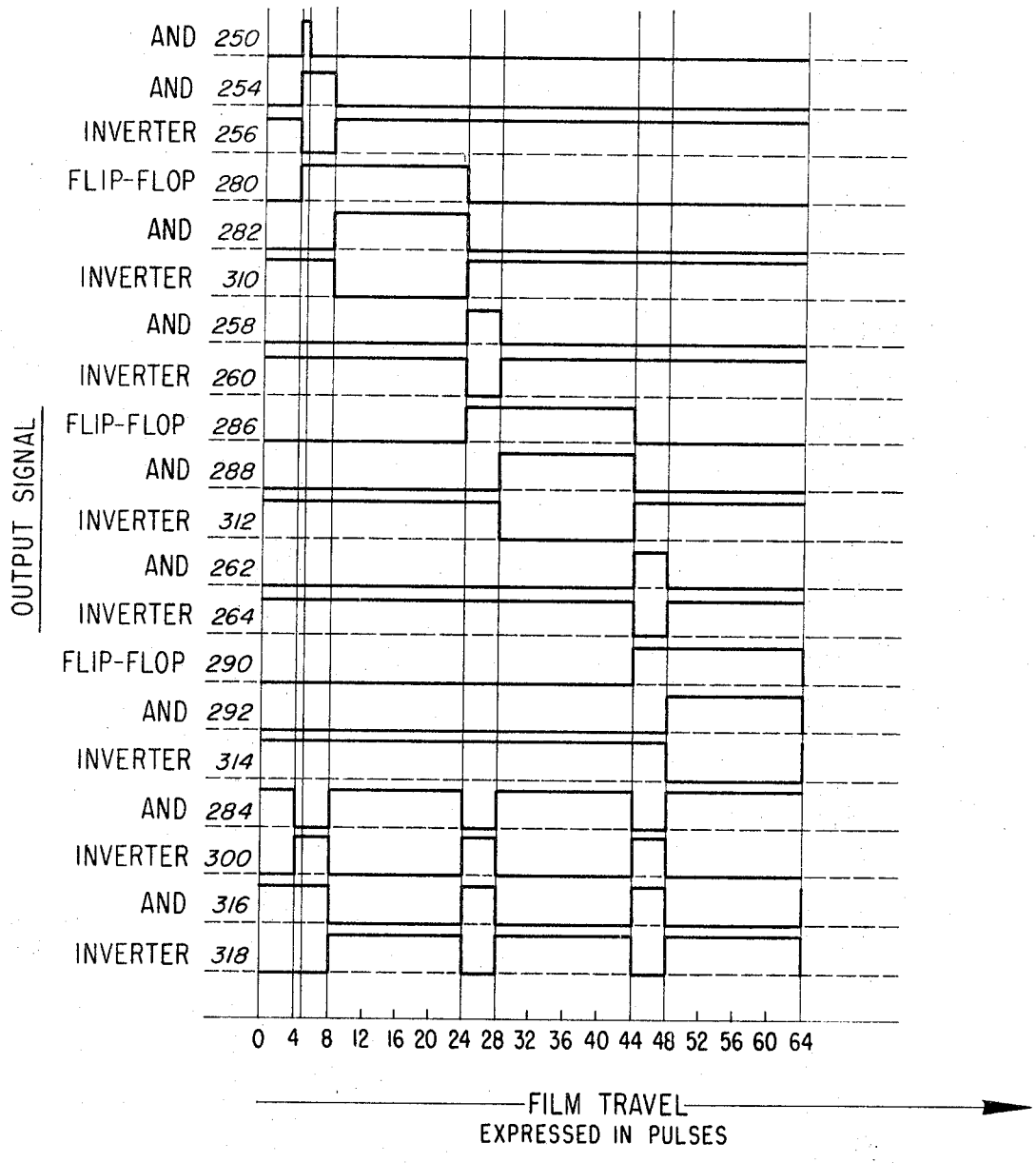
FIG. 8 is a timing diagram showing the relationship between the signals from the various components of the read control and densitometer switches control shown in FIG. 2.

The time during which read control 66 is measuring a two inch increment of film, represented by sixty-four pulses, is allocated by a decoder system using four AND circuits to provide four periods from the first pulse to the fourth pulse, from the fourth pulse to the twenty-fourth pulse, from the twenty-fourth pulse to the forty-fourth pulse, and from the forty-fourth pulse to the sixty-fourth pulse. AND circuit 250 provides an output on line 252 at the end of the first period when the binary condition of the counters in read control 66 is 001000, i.e. at the fourth pulse from amplifier 110. AND circuit 254 provides an output to AND circuit 250 and inverter 256 in the second period during the time from binary condition 001000 to binary condition 111000, i.e. from the fourth to the eighth pulse from amplifier 110. AND circuit 258 provides an output to inverter 260 in the third period during the time from binary condition 000110 to binary condition 110110, i.e. from the twenty-fourth to the twenty-eighth pulse from amplifier 110. AND circuit 262 provides an output to inverter 264 in the fourth period during the time from binary condition 001101 to binary condition 111101, i.e. from the forty-fourth to forty-eighth pulses from amplifier 110. The output signals from AND circuits 250, 254, 258, and 262 and from inverters 256, 260, and 264 are shown in FIG. 8 for one cycle of read control 66, i.e. sixty-four pulses. Binary representations used herein are written with digit position significance increasing from left to right: in the six-position binary representations used, the left-most position is the $2^0$ order, the right-most position is the $2^5$ order, and the entire representation appears as follows:

$$2^0 2^1 2^2 2^3 2^4 2^5$$

In densitometer switches control 68 inverter 256 output is connected to the set input of flip-flop 280, one input of AND circuit 282 and one input of AND circuit 284. Inverter 260 output is connected to the reset input of flip-flop 280, the set input of flip-flop 286, one input of AND circuit 288, and one input of AND circuit 284. Inverter 264 output is connected to the reset input of flip-flop 286, the set input of flip-flop 290, one input of AND circuit 292, and one input of AND circuit 284.

As can be seen more clearly in FIG. 8, inverter 256 produces a signal extending from the fourth pulse to the eighth pulse. Flip-flop 280 is set by the negative-going portion of that signal at pulse four and reset by the negative-going signal from inverter 260 at the twenty-fourth pulse. Thus, there is an output signal from flip-flop 280 on line 294 from the fourth to the twenty-fourth pulse and an output signal from AND circuit 282 from the eighth to the twenty-fourth pulse, i.e. the times at which the inputs from inverter 256 and flip-flop 280 are both present.

Inverter 260 produces a signal extending from the twenty-fourth to the twenty-eighth pulse. Flip-flop 286 is set by the negative-going portion of that signal at pulse twenty-four and reset by the negative-going signal from inverter 264 at the forty-fourth pulse. Thus, there is an output signal from flip-flop 286 on line 296 from the twenty-fourth to the forty-fourth pulse and an output signal from AND circuit 288 from the twenty-eighth to the forty-fourth pulse, i.e. the times during which inputs from inverter 260 and flip-flop 286 are both present.

Inverter 264 produces a signal extending from the forty-fourth to the forty-eighth pulse. Flip-flop 290 is set by the negative-going portion of the signal from inverter 264 at pulse forty-four and reset by the negative-going signal from flip-flop 194 the sixth order flip-flop in read control 66 as it counts the sixty-fourth pulse. Thus, there is an output signal from flip-flop 290 on lines 298 from the forty-fourth to the sixty-fourth pulse and an output signal from AND circuit 292 from the forty-eighth to the sixty-fourth pulse, i.e. the times during which inputs from inverter 264 and flip-flop 290 are both present.

AND circuit 284 provides an output only when it simultaneously receives signals from inverters 256, 260, and 264, i.e. from start to pulse four, from pulse eight to pulse twenty-four, from pulse twenty-eight to pulse forty-four and from pulse forty-eight to pulse sixty-four. Therefore inverter 300 provides an output from pulse four to pulse eight, from pulse twenty-four to pulse twenty-eight and from pulse forty-four to pulse forty-eight. These three four-pulse signals spaced by sixteen-pulse periods are supplied on line 302 to prepare densitometer 70 to operate on information from each of the red, green, and blue integrators.

The outputs on lines 294, 296, and 298 occurring from the fourth to twenty-fourth, twenty-fourth to forty-fourth and forty-fourth to sixty-fourth pulses successively connect the blue, green, and red integrators, respectively, of one of the integrator systems to densitometer 70.

The signals from AND circuits 282, 288, and 292 occurring from pulses eight to twenty-four, twenty-eight to forty-four and forty-eight to sixty-four are applied to AND circuits 304, 306, and 308 to successively deliver the blue, green, and red outputs, respectively, of densitometer 70 on line 309 to the blue, green, and red counters of accumulator 74.

The outputs of AND circuits 282, 288, and 292 are also submitted to inverters 310, 312, and 314 whose output signals are all present from start to pulse four, from pulse twenty-four to pulse twenty-eight and from pulse forty-four to pulse forty-eight resulting in output from AND circuit 316 at those times. Inverter 318, then, provides output signals from pulse eight to pulse twenty-four, from pulse twenty-eight to pulse forty-four and from pulse forty-eight to pulse sixty-four on line 320 to successively convert the analog intensity signals from each of the integrators to digital density signals in densitometer 70.

Integrator switches control 64 is controlled by the signal on line 252 from AND circuit 250 at the fourth pulse and on line 322 from flip-flop 180 as it is set by a signal from frame detector 36 on line 162. A signal on line 322 conditions flip-flop 324 to provide a signal on line 326 to contact nine of reed relay 328 and through amplifier 330 on line 332 to clear accumulator 74 after the information it contains has been read out to one of the registers on lines 236, 238, and 240.

A signal on line 252 resets flip-flop 324 thus cutting off the signals on lines 326 and 332 and changes the state of flip-flop 334 from whichever state it is in, the set or reset, to the other. Flip-flop 334 is the same type as used in read control 66, i.e. the outputs of the set and reset conditions are connected to the set and reset inputs, respectively, where they are each combined with a common input.

In the set state the output of flip-flop 334 closes contacts one, three, five, and seven of reed relay 336 and contacts one, three, five, and seven of reed relay 328 and the reset output of flip-flop 334, through inverter 359, closes contact ten of reed relay 336. In reed relay 336 contact one connects line 338 from reference integrator gate 340 in integrator gates 32, FIG. 5, to line 342 from the input of reference integrator 46; contact three connects the output line 344 from reference integrator 54 to line 346 from densitometer balance 72; contact five connects the input line 348 from blue integrator 52 to output line 350 from blue integrator gate 352; contact seven connects output line 354 from blue integrator 60 to line 356 from contact one of reed relay 358 which controls the input to densitometer 70; contact ten connects coil F to line 368 which is switched to 28 volts through contact nine of reed relay 328. Energizing coil F closes switches 406, 408, 410, and 412 enabling the information in integrators 54, 56, 58, and 60, respectively, to be destroyed after being read out to densitometer 70. This is necessary because the read out to densitometer 70 is non-destructive. The destruction is accomplished after the information in the Set II integrators has been read out to densitometer 70, when a signal on line 322 representing that a new frame has been recognized sets flip-flop 324 producing a signal on line 326 which closes contact nine of reed relay 328, thereby energizing coil F through closed contact ten of reed relay 336.

In reed relay 328 contact one connects input line 370 from green integrator 50 to output line 372 of green integrator gate 374; contact three connects output line 376 from green integrator 58 to line 378 from contact three of reed relay 358 which controls the input to densitometer 70; contact five connects input line 380 from red integrator 48 to output line 382 from red integrator gate 384; contact seven connects output line 386 from red integrator 56 to line 388 from contact five of reed relay 358 which controls the input to densitometer 70.

In the reset state the output of flip-flop 334 closes contacts two, four, six, and eight of reed relay 336, and contacts two, four, six, and eight of reed relay 328 and the set output of flip-flop 334, through inverter 405, closes contact nine of reed relay 336. In reed relay 336 contact two connects input line 390 from reference integrator 54 to output line 338 from integrator gate 340; contact four connects output line 392 from reference integrator 46 to line 346 from densitometer balance 72; contact six connects input line 394 from blue integrator 60 to output line 350 from blue integrator gate 352; contact eight connects output line 396 from blue integrator 52 to line 356 from contact one of reed relay 358 which controls the input to densitometer 70; contact nine connects coil E to line 368 which is switched to 28 volts through contact nine of reed relay 328. Energizing coil E closes switches 360, 362, 364, and 366 enabling the information in integrators 46, 48, 50, and 52, respectively, to be destroyed after being read out to densitometer 70. This is necessary because the read out to densitometer 70 is non-destructive. The destruction is accomplished after the information in the set of integrators has been read out to densitometer 70 when a signal on line 322 representing that a new frame has been recognized sets flip-flop 324 producing a signal on line 326 which closes contact nine of reed relay 328, thereby energizing coil E through closed contact nine of reed relay 336.

In reed relay 328 contact two connects input line 398 from green integrator 58 to output line 372 from green integrator gate 374; contact four connects output line 400 from green integrator 50 to line 378 from contact three of reed relay 358 which controls the input to densitometer 70; contact six connects input line 402 from red integrator 56 to output line 382 from red integrator gate 384; contact eight connects output line 404 from red integrator 48 to line 388 from contact five of reed relay 358 which controls the input to densitometer 70.

In the set condition, then, flip-flop 334 connects the inputs of integrators 46, 48, 50, and 52 in Set I to the outputs of integrator gates 340, 384, 374, and 352, respectively, connects the outputs of integrators 54, 56, 58, and 60 in Set II to densitometer 70 through contacts one, three, and five of reed relay 358, and enables the energizing line 368 to be connected to coil F. And in the reset condition flip-flop 334 connects the inputs of integrators 54, 56, 58, and 60 in Set II to integrator gates 340, 384, 374, and 352, respectively, connects the outputs of integrators 46, 48, 50, and 52 in Set I to densitometer 70 through contacts one, three, and five of reed relay 358, and enables the energizing line 368 to be connected to coil E.

In addition to the shorting switches each integrator in Sets I and II includes an amplifier with a capacitor-coupled feedback loop.

Densitometer balance 72 receives an input from one of the reference integrators 46 and 54 and produces corrected red, green and blue reference voltages on lines 414, 416, and 418. This correction is made necessary by the possibility of differences in the response of the system to the red, green, and blue light and is provided by presetting potentiometers 420, 422, and 424 to compensate for the known differences.

Figure 5:
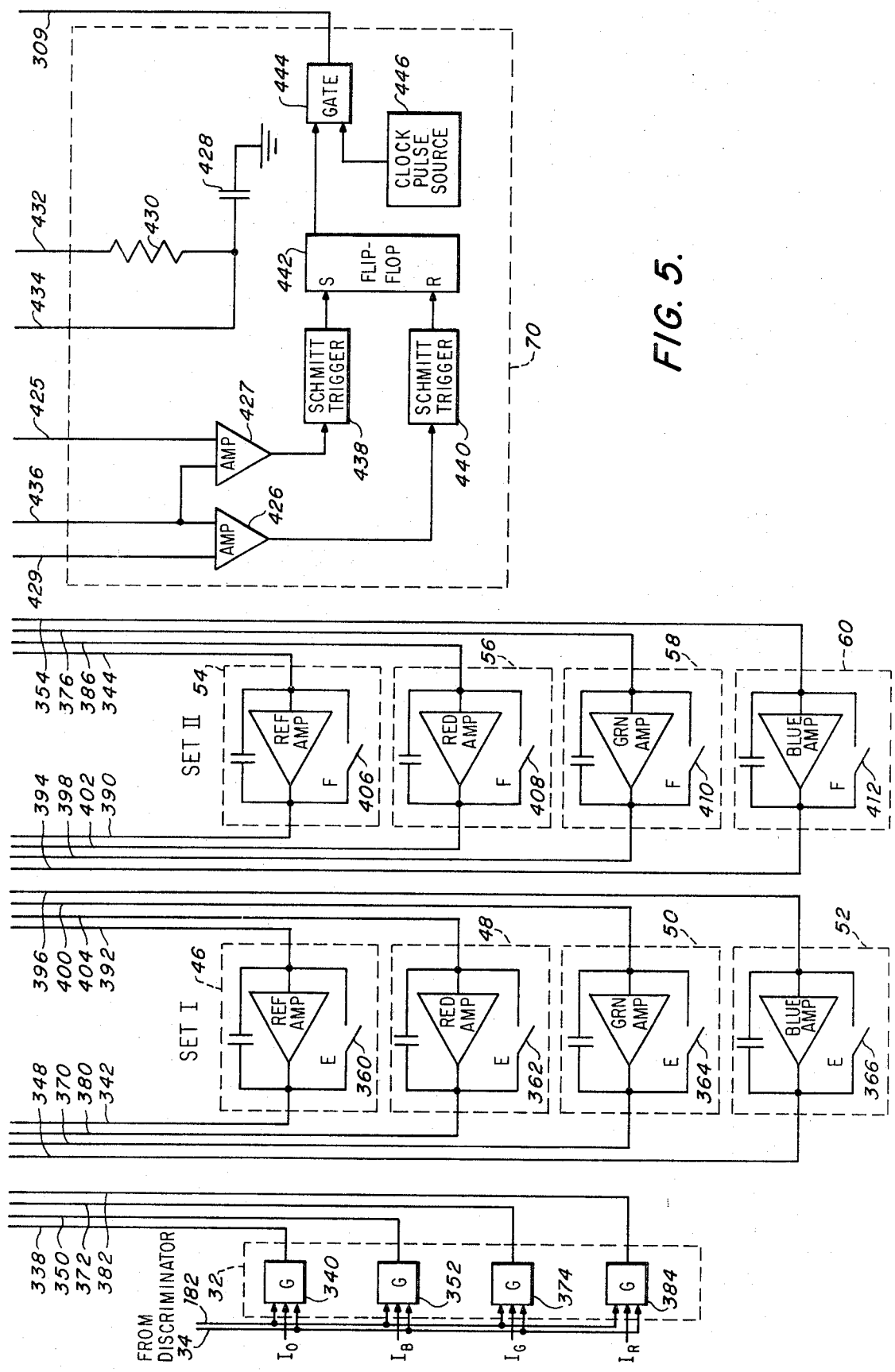
FIG. 5 is a detailed diagram of the integrator gates, integrators, and densitometer of FIG. 1.

Contacts two, four, and six of reed relay 358 connect lines 418, 416, and 414, respectively, to an input line 425 to high gain amplifier 427 in densitometer 70, FIG. 5. Contacts one, three, and five connect lines 356, 378, and 388, respectively, which are themselves connected to the outputs of either integrators 48, 50, and 52, or 56, 58, and 60, each respectively, to an input line 429 to high gain amplifier 426. Capacitor 428 is charged through resistor 430 when line 432 is connected to a 28 volt source through contact ten of reed relay 358, and is discharged on line 434 through contact nine of reed relay 358 to provide a negative exponential voltage on line 436 to amplifiers 426 and 427. As the capacitor 428 voltage exponentially decreases, it eventually becomes equal to the reference voltage on line 425 and causes high gain amplifier 427 to switch to negative saturation producing a pulse to Schmitt trigger 438. Upon further exponential decay, the capacitor discharge voltage will equal the voltage on line 429 from one of the red, green, or blue integrators and cause amplifier 426 to produce a pulse to Schmitt trigger 440.

The pulse from Schmitt trigger 438 places flip-flop 442 in the set condition which enables gate 444 to pass pulses from clock pulse source 446. The pulse from Schmitt trigger 440 places flip-flop 442 in the reset condition which disables gate 444 and stops pulses from source 446 from passing through gate 444. The output on line 309 is therefore a digital representation of the density of the red, green, and blue intensity levels sensed by photometer 12.

Further explanation and implementation of densitometer 70 appears in United States patent application S.N. 600,582, Densitometer, by John K. Bowker, filed Dec. 9, 1966.

Figure 9:
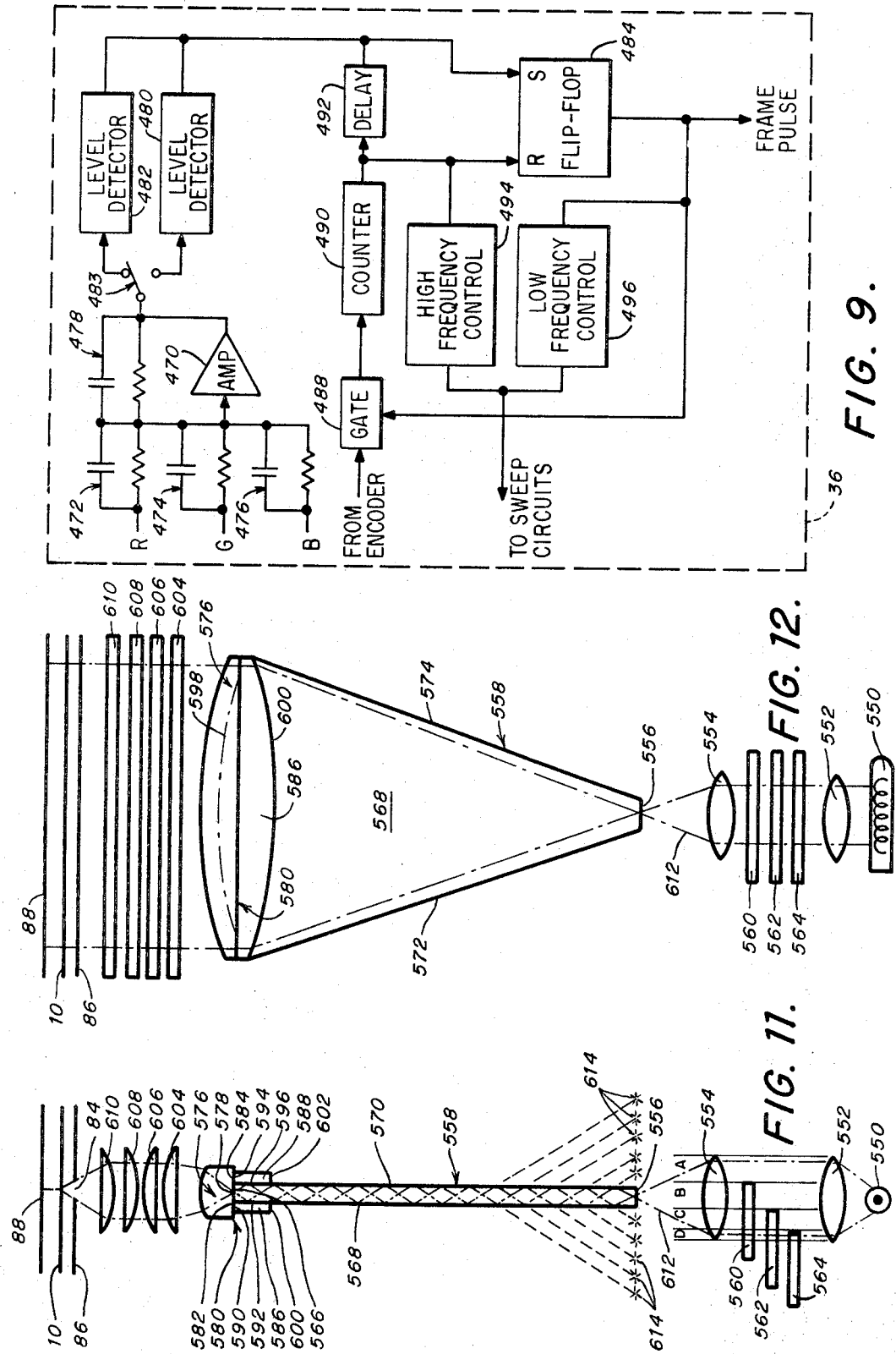
FIG. 9 is a detailed diagram of the frame detector of FIG. 1.

Frame detector 36 is shown in more detail in FIG. 9 where summing amplifier 470 receives the red, green, and blue intensity signals through three resistor-capacitor (RC) filters 472, 474, and 476, respectively, tuned to enhance signals at the frequency at which border portions of the frames pass through photometer 12. A fourth filter 478 may be provided as a feedback path for the amplifier to further peak the amplified response. The signals are summed in amplifier 470 and the resulting intensity signal is delivered to either one of level detectors 480 and 482 by switch 483. If the film being processed is a negative the signals are directed to level detector 480 which detects the positive peaks representative of the border portion whose transmittance is relatively high compared to the information-bearing portion. If the film is a positive the signals are directed to level detector 482 which detects the negative peaks representative of the border portion whose transmittance is relatively low compared to the information-bearing portion. In this embodiment film 10 is considered to be a positive and switch 483 is in contact with level detector 482.

When the portion of the signal representing that a border is being sensed is distinguished by level detector 482, a pulse is delivered to flip-flop 484. If flip-flop 484 is in the reset condition the lagging side of that pulse will then trigger flip-flop 484 and produce a frame pulse indicating that a frame has been detected. Thus, without previewing, premarking or other special provisions the frame detector detects and indicates transitions between individual frames in a series of frames. Of course, the leading edge of the pulse delivered to flip-flop 484 may also be used to trigger flip-flop 484.

Often the information-bearing portion of the frames will contain areas which have a transmittance similar to that of a border portion. To prevent these areas from falsely triggering a frame pulse a synchronizing means has been used to resist flip-flop 484 just prior to the time a border portion is expected to be sensed. Thus, spurious signals falsely indicating a border portion cannot trigger flip-flop 484 while it is in the set condition during the sensing of the information-bearing portion of the frame.

Synchronization is accomplished by encoder 42, FIG. 1 and gate 48 and counter 490, FIG. 9. Encoder 42 is connected with drive mechanism 44 and delivers a train of digital signals as a function of the distance travelled by film 10. Gate 488 is responsive to a frame pulse from flip-flop 484 to pass those digital signals to counter 490. Upon reaching a predetermined count which is a function of the distance travelled by film 10, counter 490 delivers a signal to reset flip-flop 484 enabling it to be triggered by a signal from detector 482, delivers a signal to delay 492, and delivers a signal to high frequency control 494 to increase the sweep frequency of scanner 14 during the interval when a border portion is expected to be sensed. Delay 492 is set to deliver a pulse to flip-flop 484 towards the end of the interval when a border is expected to be sensed. Thus, even if no border portion is sensed a frame pulse is produced by flip-flop 484 and the timing of the entire machine is preserved by this approximation and will be verified by the actual sensing of the next border portion. Such failure to sense a border portion is often due to a similarity between the density of the information-bearing portion of the film adjacent to the border and the density of the border portion, or to a misalignment of the film during initial exposure which results in the information-bearing portions of two frames being contiguous. The production of the frame pulse, however generated, by flip-flop 484 enables gate 488 to recycle counter 490 and causes low frequency control 496 to return sweep circuit 16 to the low sweep rate.

The use of different sweep rates for the border and information-bearing portions of the film is not essential to proper operation of the frame detector and may be eliminated in other embodiments. Separate sweep rates are used in the specific embodiment herein described because a first sweep rate is desirable for transferring information from the information-bearing portion of the film to the system at a rate at which the system can best operate. A higher, second sweep rate is desirable for detecting a border portion because the portion of the system responsive to the detection signals can operate at higher speeds. The higher sweep rate also provides more scan lines per unit length of film thereby shortening the period between successive scan lines wherein a border portion may pass undetected.

Figure 10:
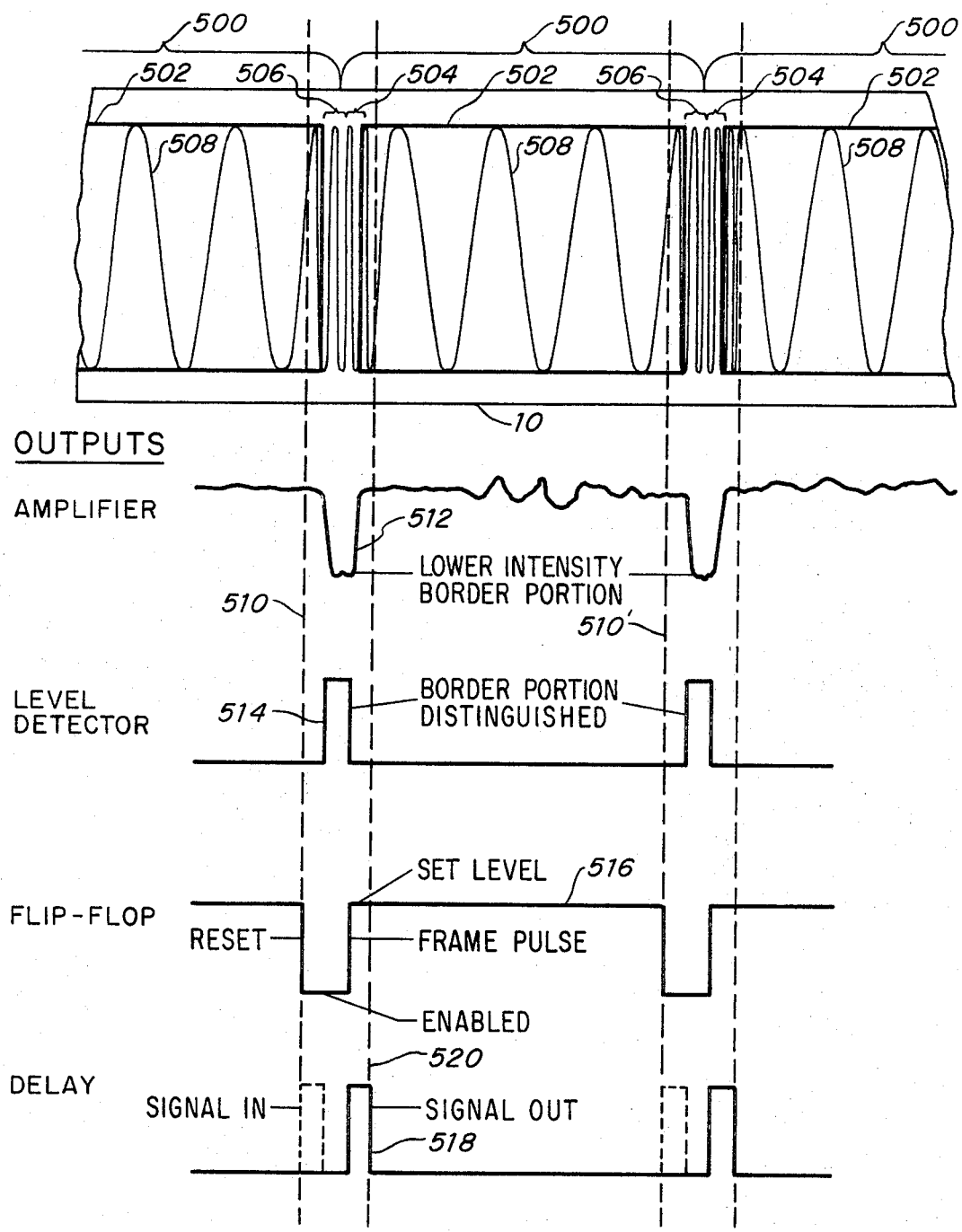
FIG. 10 is a timing diagram showing the operating relationship between the components of the frame detector of FIG. 9.

The timing involved in the operation of the frame detector is shown in FIG. 10, with reference to a positive film. Film 10 has frames 500 having information-bearing portions 502 and border portions 504 and 506. As the film moves to the left in FIG. 10, through photometer 12, portion 502 is sensed by the three photomultipliers as it is scanned by low frequency sweep 508. Just prior to the time scanner 14 illuminates border 506, counter 490 reaches the count at which it resets flip-flop 484, provides a pulse to delay 492 and triggers high frequency control 494. This point in time is represented by line 510. As borders 506 and 504 are sensed a negative pulse 512 is developed which causes level detector 482 to produce pulse 514. Since flip-flop 484 is enabled, it is triggered by the sharply descending lagging side of pulse 514 to the set (disabled) condition producing set level output 516, or the frame pulse. While at this level, flip-flop 484 cannot again be triggered and it will not be reset until the time represented by line 510' is reached. Had a pulse 512 not been produced, pulse 518, the signal out of delay 492, would have occurred and triggered flip-flop 484 to carry on the timing of the system. Pulse 518 is provided to have its lagging, descending side coincident with the time represented by line 520. Times represented by lines 510 and 520 define the interval during which border portions are expected and will be accepted. Those occurring at other times are not accepted as they are unable to trigger disabled flip-flop 484.

Further explanation and implementation of frame detector 36 appears in United States patent application S.N. 665,426, Frame Detector, by Charles M. Stasey, filed Sept. 5, 1967.

Printing optics 78 is shown in detail in FIGS. 11 and 12 where a quartz-iodine lamp 550 is used as the primary light source supplying light to condenser lens 552 which collimates and directs the light to a second condenser lens 554 that focuses or concentrates the light on a portion of small rectangular face 556 of light pipe 558. Cyan 560, magenta 562, and yellow 564 filters are introduced into the collimated light between lenses 552 and 554 to control the spectral intensity of the light concentrated on face 556.

The light is conducted through light pipe 558 to face 566 between a pair of parallel walls 568 and 570 which are narrow at face 556 and wide at face 566, and a pair of diverging walls 572 and 574, FIG. 12, which diverge towards face 566. As a result, faces 556 and 566 are equal in the thickness dimension but face 566 is substantially larger in the width dimension, having the form of an elongated rectangle.

Slabbed lens 576, which is formed of a section of a plano-convex lens, has the central portion 578 of its planar surface 580 cemented to face 566, the two being coextensive in the width dimension but not in the thickness dimension. Lens 576 provides complete collimation of the light in the width dimension but no collimation of the light in the thickness dimension.

In the thickness dimension outer portions 582, 584 of surface 580 extend beyond walls 568 and 570 to engage curved transition sections 586, 588, respectively. Transition section 586 has its planar surface 590 cemented to portion 582 of surface 580 and its side wall 592 cemented to wall 568 of light pipe 558, and transition section 588 has its planar surface 594 cemented to portion 584 of surface 580 and its side wall 596 cemented to wall 570 of light pipe 558.

Where light pipe 558 without lens 576 and sections 586 and 588, a flat natural transition aperture would be present at face 566; transition aperture is defined as the area at the end of the light pipe from which the light rays depart the light pipe without encountering further internal reflection and it functions as a secondary light source. With the addition of lens 576 to collimate the light from light pipe 558, a composite lens is formed consisting of light pipe 588 and lens 576 which has its focus in the width dimension at face 556 and which creates a field of light beyond lens 576 curved as a result of the curvature in the apparent light source 598 of the transition aperture. The curved apparent light source 598 is a result of the additional thickness toward the center of lens 576 which is necessary for it to perform its collimating function. If uncorrected, the curved field of light would eventually result in the production of a curved light source at the film.

But the curvature is corrected by the addition of transition sections 586 and 588 on either side of light pipe 558, which enlarges the cross-section of the light pipe in the thickness dimension in a curved path along the convex surfaces 600, 602 of transition sections 586, 588, respectively, behind the natural transition aperture at face 566. This establishes a corrected transition aperture in that curved path which is symmetrically and oppositely curved relative to the curvature imparted by lens 576. The result is that lens 576 creates a flat corrected elongated source of light diverging in the first dimension at face 566 of the corrected curved transition aperture.

Leaving lens 576 the light is fully collimated in the width dimension but is uncollimated in the thickness dimension. Cylindrical lenses 604 and 606 receive and further collimate in the thickness dimension the light diverging from lens 576 and cylindrical lenses 608 and 610 focus that collimated light in the thickness dimension to provide an elongated rectangular source of light to illuminate the print stock 88 through film 10 at slit 84 in plate 86. In this embodiment the elongated rectangular light source provided at film 10 is approximately one-eighth inch thick by nine inches wide to correspond to slit 84. Four cylindrical lenses 604, 606, 608, and 610 are used rather than two to maximize the solid angle collected in the thickness dimension.

As the collimated light passes from lens 552 to lens 554 filters 560, 562, and 564, functioning as a subtractive color correction system, are introduced into the light to prevent all but the desired amounts of red, blue, and green light from passing to lens 554. As a result, the light from the lens 554 contains the total amounts of red, blue, and green light desired but not uniformly distributed: the cone of light 612 between lens 554 and face 556, thus the concentration of light on face 556, contains the correct average amounts of the primary colors but individual portions of the light may contain more or less of the colors.

This is apparent from FIG. 11 where portion A of the light, uninterrupted by any filter, contains all colors, portion B, interrupted by cyan 560 filter which eliminates red light, contains green and blue light, portion C, interrupted by cyan 560 and magenta 562 filters which eliminate red and green light, contains only blue light, and portion D interrupted by cyan 560, magenta 562, and yellow 564 filters which eliminate red, green, and blue light, contains no red, green or blue light. The total or average amounts of red, green, and blue light in portions A, B, C, and D may be correct, but of course the color content of each portion individually is not.

However, uniform intensity is obtained with this apparatus, for as the light travels to face 566 diverging within walls 572 and 574 in the width dimension, it is internally reflected by walls 568 and 570 many times to form a plurality of virtual images 614 of the light focused on face 556 as seen at the transition aperture. Because the light diverges in the width dimension, the light from each of the images appears along the entire elongated transition aperture. The focusing of the light from all of the images as it leaves the transition aperture by the cylindrical lenses 604, 606, 608, and 610 thoroughly mixes the light of all colors from all the virtual images 614 when they are brought to a common focus and provides an elongated rectangular source of light of the correct spectral intensity which intensity is uniform over the whole of that elongated rectangular source.

Further explanation and implementation of printing optics 78 appears in Itek Corporation Disclosure Docket No. I-226.

In operation with frame size program switch 90, FIG. 7, set to energize coil B for processing 4½ inch frames, contact $A_1'$ is closed and contacts $A_1$, $A_2$, and $A_3$ are open; contacts $B_1'$ and $B_3'$ are open an contacts $B_1$, $B_2$, and $B_3$ are closed; contacts $C_1'$ and $C_3'$ are closed and contacts $C_1$, $C_2$, and $C_3$ are open; contacts $D_1$ and $D_3$ are open and contact $D_1'$ is closed.

Flip-flop 334 is in the set state so that contacts one, three, five, seven, and ten of reed relay 336 and contacts one, three, five, and seven of reed relay 328 are closed. Thus, the integrators of Set I have their inputs connected to integrator gates 32, the red, green, and blue integrators of Set II have their outputs connected to contacts one, three, and five of reed relay 358, and the reference integrator of Set II is connected to densitometer balance 72, which in turn supplies its blue reference, green reference, and red reference signals to contacts two, four, and six of reed relay 358, respectively.

With all registers cleared, all counters in the zero condition and flip-flop 334 in the set condition, film 10 is introduced into photometer 12 where it is illuminated by scanner 14 and the light from the film is sensed by photomultipliers 18, 22, 26, and 30. As soon as a border portion of the first frame is distinguished by frame detector 36, a signal appears on line 162 and sets flip-flops 146 and 180. The set output from flip-flop 180 provides a signal on line 182 to enable integrator gates 32 in conjunction with a signal from color discriminator 34, and provides a signal on line 322 which sets flip-flop 324. The set output of flip-flop 324 provides an output on line 326 which closes contact nine of reed relay 328 connecting 28 volts to line 368 which is switched to coils E and F by contacts nine and ten, respectively, of reed relay 336. Because flip-flop 334 is initially in the set state, inverter 405 provides no output to close contact nine of reed relay 336 but inverter 359, responsive to the reset output of flip-flop 334, provides an output that holds closed contact ten of reed relay 336. When flip-flop 324 is set by the signal on line 322 at the first pulse, or frame detection time, it provides a steady signal on line 326 which holds closed contact nine of reed relay 328 thereby connecting the 28 volts to line 368 and energizing coil F through closed contact ten of reed relay 336. Since read control 66 is not now operative there is no pulse supplied on line 252 at the fourth pulse to interchange the connection of integrator Sets I and II by changing the state of flip-flop 334, or to deenergize coil F by resetting flip-flop 324 which cuts off the signal on line 326 and opens contact nine of reed relay 328. Thus, Set II integrators are shorted out by closed switches 406, 408, 410, and 412, during the entire time the first frame of the film is being sensed. When the frame detection signal at the end of the first frame and beginning of the second frame occurs it will cause a signal once more to emanate from flip-flop 180 on line 322 which will attempt to set the already set flip-flop 324. However, in this situation a signal is produced on line 252 at the fourth pulse resetting flip-flop 324, which disconnects 28 volts from line 368, and closing contact nine of reed relay 336. Switches 360, 362, 364, and 366 across the Set I integrators are closed while the information in those integrators is being read out to densitometer 70, so that upon the next frame detection, when contact nine of reed relay 328 is closed by a signal on line 326 produced by flip-flop 324 in the set state, connecting line 368 to 28 volts, the information in those Set I integrators will be destroyed before the Set I integrators are connected to integrator gates 32.

The set output of flip-flop 146 enables gate 114 to pass the pulses from amplifier 110 to counter 130 as the first frame of film 10 proceeds through photometer 12. At the sixty-fourth pulse a signal on line 164 from counter 130 resets flip-flop 146. The change from the set to the reset state of flip-flop 146 disables gate 114 and provides a signal through closed contacts $A_1'$ to set flip-flop 148. The set output from flip-flop 148 enables gate 116 to pass pulses from amplifier 110 to counter 132. When the sixty-fourth pulse is accumulated in counter 132 a signal appears on line 170 to reset flip-flop 148. The change of state from the set to the reset condition of flip-flop 148 provides a signal to disable gate 116, a signal on line 216 to shift register 200, which signal is inoperative because of open contacts B₃', and a signal to set flip-flop 172 and to reset flip-flop 180 via closed contacts B₁. With the resetting of flip-flop 180 the signal on line 182 is cut off and integrator gates 32 are closed until the next frame detection signal is provided on line 162. The signal from flip-flop 172 in the set condition is made available to the set input of flip-flop 150 but is ineffective to switch its state because flip-flop 150 is only responsive to a change from the set to the reset state of flip-flop 172 or 148. This signal from flip-flop 172 is similarly ineffective as submitted to register 200 over line 214 through closed contacts B₃ because register 200 also is only responsive to a change from the set to the reset state of flip-flop 172. Finally, the set output of flip-flop 172 is delivered on line 176 to enable gate 178 to pass pulses from encoder 42 to flip-flop 184. At this point read control 66 has assumed the measuring function for the first frame of film using the six-order counter comprising flip-flops 184, 186, 188, 190, 192, and 194. Also at this time the second frame has moved into photometer 12 and the border section preceding it has been distinguished, causing flip-flop 180 to be set, resulting in a signal on line 322 which sets flip-flop 324 whose output on line 326 causes contact nine of reed relay 328 to be closed. Since flip-flop 234 is in the set condition, coil F is energized through contact ten of reed relay 336 and closed switches 406, 408, 410, and 412 to destroy any information in the Set II integrators. The signal on line 332 produced by the set output of flip-flop 324 also clears accumulator 74.

At the fourth pulse or count a signal on line 252 from AND circuit 250 resets flip-flop 324, thereby cutting off any signals on lines 326 and 332 and opening contact nine of reed relay 328 which disconnects line 368 from 28 volts. This signal on line 252 also switches flip-flop 334 to the reset state opening the previously closed contacts one, three, five, seven, and ten of reed relay 336 and one, three, five, and seven of reed relay 328, while closing contacts two, four, six, eight, and nine of reed relay 336 and two, four, six, and eight of reed relay 328. Thus, the integrators of Set II now have their inputs connected to integrator gates 32; the red, green, and blue integrators of Set I have their outputs connected to contacts one, three, and five of reed relay 358; and the reference integrator of Set I is connected to densitometer balance 72, which in turn supplies its blue reference, green reference, and red reference signals to contacts two, four, and six of reed relay 358.

From the fourth to the eighth pulse AND circuit 254 provides an output to inverter 256; from the twenty-fourth to the twenty-eighth pulse AND circuit 258 provides an output to inverter 260; and from the forty-fourth to the forty-eighth pulse AND circuit 262 provides an output to inverter 264. These outputs are individually inverted by inverters 256, 260, and 264 and submitted to AND circuit 284 whose output is inverted by inverter 300. The result is a series of three signals on line 302 which occur from the fourth to the eighth pulse, the twenty-fourth to the twenty-eighth pulse and the forty-fourth to the forty-eighth pulse and are used to close contact ten of reed relay 358 whereby capacitor 428 may be charged through line 432 and resistor 430.

The outputs from inverters 256, 260, and 264 are applied to the set inputs of flip-flops 280, 286, and 290, respectively; the reset inputs of these flip-flops receive signals from inverters 260, 264, and counter 194, respectively. The result is a signal from flip-flop 280 on line 294, which closes contacts one and two of reed relay 358, connecting the output from blue integrator 52 to amplifier 426 via line 429, and the output of potentiometer 424 to amplifier 427 via line 425 from the fourth to the twenty-fourth pulse; a signal from flip-flop 286 on line 296, which closes contacts three and four of reed relay 358, connecting the output from green integrator 50 to amplifier 426 via line 429, and the output of potentiometer 422 to amplifier 427 via line 425 from the twenty-fourth to the forty-fourth pulse; a signal from flip-flop 290 on line 298, which closes contacts five and six of reed relay 358, connecting the output from red integrator 48 to amplifier 426 via line 429, and the output of potentiometer 420 to amplifier 427 via line 425 from the forty-fourth to the sixty-fourth pulse.

The times defined by the first four pulses of each of the twenty-pulse groups provided by each of flip-flops 280, 286, and 290 are used to charge capacitor 428. The times defined by the remaining sixteen pulses in each group as produced by AND circuits 282, 288, and 292 are used to successively enable AND gates 304, 306, and 308, respectively, to pass the blue, green, and red density information to counters 230, 232, and 234, respectively. The outputs of AND circuits 282, 288, and 292 are also individually inverted by inverters 310, 312, and 314, respectively, and then combined in AND circuit 316, whose output is inverted by inverter 318 to provide a series of three signals from the eighth to the twenty-fourth, the twenty-eighth to the forty-fourth and the forty-eighth to the sixty-fourth pulses on line 320 which are used to close contact nine of reed relay 358, to connect capacitor 428 on line 434 to the common input line 436 to amplifiers 426 and 427 simultaneously with the connection of each of the blue 52, green 50, and red 48 integrators and the blue 424, green 422, and red 420 reference potentiometers.

When the sixty-fourth pulse is counted by flip-flop 194 a signal is produced on line 196 which resets flip-flop 172 cutting off the enabling signal on line 176 to gate 178 and switching flip-flop 150 to the set state through contacts B₂. With gate 118 enabled, counter 134 now begins to accumulate the pulse count for the next two inches of travel of the first frame.

As flip-flop 172 changes from the set to reset state a signal is also provided on line 214 and delivered to register 200 via closed contacts B₃ to shift information in accumulator 74 derived from the first frame from lines 236, 238, and 240 directly to register 200 by-passing register 198.

At the sixty-fourth pulse counter 134 resets flip-flop 150, disabling gate 118, setting flip-flop 152, and providing an output on line 218 to shift the information in register 200 derived from the first frame to register 202.

At the time flip-flop 150 is being reset the second frame has passed through photometer 12, the information sensed from that second frame is stored in the Set II integrators, and flip-flop 148 is being reset. The resetting of flip-flop 148 transfers the measuring function for the next two inches of travel of the second frame to read control 66, while a signal on line 162 indicates the arrival of a third frame at photometer 12.

Meanwhile, with the setting of flip-flop 152, gate 120 is enabled and counter 136 assumes the measuring function for the next two inches of travel of the first frame, and then resets flip-flop 152. As flip-flop 152 switches to the reset state gate 120 is disabled, flip-flop 154 is set through closed contacts C₁' and an output is produced on line 220 through closed contacts C₃' to register 204 to shift the information derived from the first frame from register 202 to register 204.

Now counter 138 is measuring the next two inches of travel of the first frame and at the sixty-fourth pulse accumulated it will reset flip-flop 154, disabling gate 122, setting flip-flop 156 and producing an output on line 222 to shift the information derived from the first frame from register 204 to register 206. At this point the fourth frame is entering photometer 12, the information from the third frame is stored in the Set I integrators and is about to be read out to densitometer 70 under the direction of read control 66, and the information from the second frame is in register 202.

Counter 140 is now measuring the movement of the first frame via enabled gate 124. After two inches of travel, at the sixty-fourth accumulated pulse, counter 140 resets flip-flop 156, disabling gate 124, setting flip-flop 158 and producing an output on line 224 to shift the information derived from the first frame from register 206 to register 208.

Counter 142 is now measuring the travel of the first frame through gate 126 enabled by set flip-flop 158. At the sixty-fourth pulse flip-flop 158 is reset disabling gate 126, setting flip-flop 160, and producing an output on line 226 to shift the information derived from the first frame from register 208 to register 210. Simultaneously, the fifth frame is arriving at photometer 12, the information derived from the fourth frame is in the Set II integrators, the information derived from the third frame is in register 202, and the information derived from the second frame is in register 206.

The final two inches of travel of the first frame is measured by counter 144 through enabled gate 128. At the sixty-fourth pulse flip-flop 160 is reset disabling gate 128 and producing an output on line 228 to shift the information derived from the first frame to register 212. The digital information in register 212 is read out directly to digital-to-analog converter 80 which provides a red, a green, and a blue analog input to filter-servo 82 to drive the cyan 560, magenta 562, and yellow 564 filters, while the first frame is between the exposing light from printing optics 78 and the print stock 88.

It should be appreciated that although the particular preferred embodiment herein shown and described pertains to an automatic color printer machine, the invention is applicable to machines for printing black and white photographs as well, that the invention may be used to continuously process any type of photographic material, and that the embodiment shown is operative and inventive with less than all the features described.

Other embodiments will occur to those skilled in the art and are within the following claims.

What is claimed is:

1. An automatic printing machine for controlling the continuous individual printing of a succession of individual film segments comprising:
   drive means for moving film having individual segments to be printed through said machine;
   scanning means for illuminating and sensing the intensity of the light from the film;
   integrator means, responsive to said scanning means, for summing the intensity of the light sensed from individual segments of the film;
   storage means for individually storing the information sensed from individual film segments;
   read control means for directing transfer of information relating to individual film segments from said integrator means to said storage means;
   printing means for exposing print stock through individual film segments;
   control means, responsive to said storage means for individually controlling the exposure of each film segment at said printing means; and,
   synchronizing means, responsive to movement of the film for timing the operation of said read control means and for transferring particular information from said storage means to said servo-mechanism means when the segment from which that information was derived is at said printing means.

2. The machine of claim 1 in which said integrator means includes:
   a first integrator system;
   a second integrator system; and
   said read control means includes first switching means for selectively, alternatively, connecting said scanning means to one of said systems and connecting the other of said systems to said storage means.

3. The machine of claim 1 further comprising accumulator means, responsive to said read control means for accumulating information from said integrator means for transfer to said storage means.

4. The machine of claim 1 in which said synchronizing means includes a timing pulse source for supplying timing pulses as a function of film travel.

5. The machine of claim 1 in which said scanning means includes:
   a cathode ray tube for illuminating the film with a line raster transverse to the direction of film travel; and,
   a light sensitive element for sensing the intensity of the light from the film.

6. The machine of claim 4 in which said read control means includes:
   measuring means, responsive to said timing pulse source, for measuring a predetermined distance of film travel equivalent to the length of a said segment; and,
   time allocating means, responsive to said measuring means for providing a plurality of periods during the time the film travels a segment length.

7. The machine of claim 6 in which said measuring means includes first counter means for accumulating said timing pulses and said time allocating means includes decoder means, responsive to predetermined numbers accumulated in said first counter means, to establish said periods.

8. The machine of claim 7 in which said integrator means includes first and second integrator systems and said read control means includes first switching means for selectively, alternately connecting said scanning means to one of said systems, and connecting the other of said systems to said storage means, said first switching means including a bistable device, responsive to said decoder means, for interchanging the connection of said systems.

9. The machine of claim 4 in which said synchronizing means includes:
   second measuring means, responsive to said timing pulse source, for measuring film travel; and,
   storage control means, responsive to said second measuring means for providing a signal to said storage means each time a segment length is measured.

10. The machine of claim 9 in which said second measuring means includes a series of interconnected counters, having a number of counters corresponding to the number of said segment lengths extending between said printing means and said scanning means.

11. The machine of claim 10 further comprising segment size programming means for programming said second measuring means to measure various segment lengths.

12. The machine of claim 4 in which said timing pulse source includes encoder means having a light source, a light sensing element, and light interrupting means, driven by said drive means, between said light source and said light sensing element for producing a train of signals as a function of film travel.

13. An automatic printing machine for controlling the continuous individual printing of a succession of individual film frames comprising:
   drive means for moving film to be processed through said machine;
   scanning means for illuminating and sensing the intensity of the light from the film;
   integrator means, responsive to said scanning means, for summing the intensity of the light sensed from individual frames of the film;
   storage means for individually storing the information sensed from each film frame;
   read control means for directing transfer of information relating to individual film frames from said integrator means to said storage means;
   printing means for exposing print stock through individual film frames;
   control means, responsive to said storage means for individually controlling the exposure of each film frame at said printing means;

frame detector means for distinguishing frames on the film; and, synchronizing means, responsive to movement of the film and said frame detector means, for timing the operation of said read control means and for transferring particular information from said storage means to said servo-mechanism means when the frame from which that information was derived is at said printing means.

14. The machine of claim 13 further comprising gate means, responsive to said frame detector, for controlling the transfer of information from said scanning means to said integrator means.

15. An automatic printing machine for controlling the continuous, individual printing of a succession of individual film segments comprising:

drive means for moving film having individual segments to be processed through said machine;

scanning means for illuminating and sensing the intensity of the light from the film;

integrator means, responsive to said scanning means, for summing the intensity of the light sensed from individual segments of the film;

storage means for individually storing the information sensed from individual film segments;

read control means for directing transfer of information relating to individual film segments from said integrator means to said storage means;

printing means for exposing print stock through individual film segments;

control means, responsive to said storage means, for individually controlling the exposure of each film segment at said printing means;

color concentration discriminator means for controlling the transfer of information to said integrator means from said scanning means; and, synchronizing means, responsive to movement of the film, for timing the operation of said read control means and for transferring particular information from said storage means to said servo-mechanism means when the segment from which that information was derived is at said printing means.

16. The machine of claim 15 in which said scanning means senses contiguous portions of the segments of the film, and said color concentration discriminator means includes:

means, responsive to said scanning means, for determining the amounts of said color components at each of said portions; and, means, responsive to said means for determining, for detecting changes in the amounts of said color components at successively sensed ones of said portions.

17. The machine of claim 16 in which said scanning means includes:

a cathode ray tube for successively illuminating said contiguous portions of the segments; and, three light sensitive elements for sensing the intensity of red, blue, and green light, respectively, from the film.

18. The machine of claim 16 in which said means for determining includes a logarithmic converter responsive to each of said color components for providing the amounts of said color components sensed irrespective of the brightness level at which said color components are sensed.

19. The machine of claim 16 in which said means for determining includes a differencing amplifier for providing the difference between the amounts of said color components.

20. The machine of claim 16 further comprising level detector means, responsive to said means for detecting, for indicating a predetermined change in the amounts of said color components.

21. The machine of claim 18 in which there are three color components and they are the primary colors red, green, and blue and there are three logarithmic converters, one responsive to each of said color components.

22. The machine of claim 19 in which there are three color components and they are the three primary colors red, green, and blue, and there are two differencing amplifiers, one for providing the difference between the amounts of the red and green components and one for providing the difference between the amounts of the red and blue components.

23. An automatic printing machine for controlling the continuous, individual printing of a succession of individual film segments comprising:

drive means for moving film having independent segments to be processed through said machine;

scanning means for illuminating and sensing the intensity of the light from the film;

integrator means, responsive to said scanning means, for summing the intensity of the light sensed from individual segments of the film;

storage means for individually storing the information sensed from individual film segments;

read control means for directing transfer of information relating to individual film segments from said integrator means to said storage means;

printing means for exposing print stock through individual film segments;

control means, responsive to said storage means, for individually controlling the exposure of each film segment at said printing means;

density converter means, responsive to said integrator means, for converting the information in said integrator means in the form of analog intensity signals to digital density signals for delivery to said storage means; and, synchronizing means, responsive to movement of the film, for timing the operation of said read control means and for transferring particular information from said storage means to said servo-mechanism means when the segment from which that information was derived is at said printing means.

24. The machine of claim 23 in which said density converter means includes:

first means for comparing an analog reference signal and an exponentially varying timing signal and providing a first pulse when the values of said reference and timing signals coincide;

second means for comparing an analog intensity signal and providing a second pulse when the values of said intensity and timing signals coincide;

a clock pulse source; and, second gate means responsive to said first and second comparing means for passing pulses from said clock pulse source after said first pulse and preventing passing of pulses after said second pulse.

References Cited

UNITED STATES PATENTS 2,912,487 11/1959 Horsley.
2,971,448 2/1961 Baumbach et al. _____ 355—88
3,062,096 11/1962 Brown.
3,120,782 2/1964 Goddard et al.

NORTON ANSHER, Primary Examiner

R. L. MOSES, Assistant Examiner

U.S. Cl. X.R.

355—38, 68, 83; 178—5.2